United States Patent [19]
Rieder et al.

[11] Patent Number: 5,804,527
[45] Date of Patent: Sep. 8, 1998

[54] PLANAR STRUCTURAL PART AS FILLER- OR CARRIER BODY FOR CATALYSTS, CONDENSER BODIES, FILTERS AND THE LIKE

[76] Inventors: Helmut Rieder, Südtirolerplatz 10, 8020 Graz; Franz Stuhlbacher, Harterstrasse 26, 8053 Graz, both of Austria

[21] Appl. No.: 523,628

[22] Filed: Sep. 5, 1995

[30] Foreign Application Priority Data

Sep. 5, 1994 [AT] Austria ................................. 1692/94

[51] Int. Cl.⁶ ...................................................... B01J 35/02
[52] U.S. Cl. .......................................... 502/439; 502/527
[58] Field of Search ...................................... 502/439, 527

[56] References Cited

U.S. PATENT DOCUMENTS 3,998,599  12/1976  Fedor ........................................ 502/527
5,011,810   4/1991  Michimoto ............................... 502/439
5,436,216   7/1995  Toyao et al. ............................. 502/439

FOREIGN PATENT DOCUMENTS 2131119   5/1990  Japan .
4-104839  4/1992  Japan .

*Primary Examiner*—Glenn Caldarola
*Assistant Examiner*—Thuan D. Dang
*Attorney, Agent, or Firm*—Jacobson, Price, Holman & Stern, PLLC

[57] ABSTRACT

A structural element for use as a carrier body in a catalytic process, condenser body or filter is formed by unwinding a foil from a roll, forming staggered cuts in the foil, and stretching the foil transversely to convert the cuts into hexagonal apertures interconnected by webs which become twisted to provide the sheet with a depth dimension. The sheet can be cut to length and layered with other like sheets in a flat or rolled form.

3 Claims, 1 Drawing Sheet

PLANAR STRUCTURAL PART AS FILLER- OR CARRIER BODY FOR CATALYSTS, CONDENSER BODIES, FILTERS AND THE LIKE

FIELD OF THE INVENTION

This invention relates to a planar structural part for use as a filler- or carrier body for catalysts, condensor bodies, filters and the like comprising a continuous honeycomb shape body, formed out of a number of webs, and which is insertable in a given cross sectional area, e.g. in a tubular part flowed through by a medium.

BACKGROUND OF THE INVENTION

It is known to produce such planar or rolled structural parts by punching or stamping, in which oscillating machine parts are used rather than a continuous process of forming. Therefore such processes are time consuming and are not economical.

Furthermore, for different applications, different filler bodies are necessary. Thus, for catalytic cleaning of exhaust gases and in other catalytic processes, a catalyst carrier body made of ceramics or alternating layers of plain or rolled sheet is necessary. For the exhaust gas, this results in a large distance to cover resulting in filler bodies of large volume.

Gas back draft pressures cannot diminish in the given distance and undesirable, pressure losses may occur.

SUMMARY OF THE INVENTION

One object of the invention is to provide a catalyst carrier body, which in total volume is significantly smaller in comparison to usual volume sizes of catalyst carrier bodies and which is able to effect improved catalytic transformations of exhaust gases.

According to the invention this aim is achieved by a structural part rolled up cylindrically, in oviform or similar cross-section, or formed as plane laminated layers, each having apertures defined by webs disposed at random angles and/or levels to the flow direction and wherein the individual layers are fixed under initial tension. By this arrangement, laminar as well as turbulent flows occur in the interior of the body, so that the flowing medium has a larger catalytic surface.

This invention thus provides a plannar structural part for use as a filler- or carrier body for catalysts, condenser bodies, filters and the like with honeycomb shaped bodies formed by a multitude of webs, and which is in volume significantly less than known form bodies.

The aim is achieved by a form body which is rolled up cylindrically, in oviform or similar, cross section, in several layers, or arranged as plane layers laminated, compressed and fixed under initial tension.

It is of advantage, that the webs enclose a hexagonal, honeycomb-shaped hollow spaces with the top of the hexagon pointing lengthwise, and the structural part being rolled about a lengthwise axis, so that smaller diameters can be used without having folds form in the rolling processes.

It is also of advantage, if the structural part is rolled up transversely to the longitudinal axis and, if applicable, is combined with a multilayered formed body of equal or different rolling direction. By this arrangement the catalytic conversion is improved.

It is further advantageous if in smaller units, the structural parts are fixed in frames which are changeable. Here, an alternating moving direction is made possible and an efficient initial tension is achieved.

Larger units may be connected with adjoining structural parts by welding, soldering, pasting or clamping of the outer lateral webs forming a continuous unit. In such way, also appliances of high volumes can be filled.

It is additionally of advantage if the structural part after the rolling process is lopped in pieces, cylindrically bent, twisted at the ends, and continuously rolled into cylindrical form bodies which serve as filler bodies. With this construction, other applications like filler bodies for fuel tanks and the like can be made. The main advantage is, that up to 60% of hydrocarbon or similar volatile gases in the tank can be withdrawn from natural evaporation. Reduction of algae growth in tanks, especially when using Diesel- or biological fuels, is also achieved.

It is advantageous, if the borders of the planar structural part get the same length reduction by the depth of teeth of the hoisting device, which corresponds to the change of length caused by the expansion of the foil strip into the structural part when forming the apertures and webs, and it is coiled into a roll or package. This provides a plane clean area in the finished foil strip.

DESCRIPTION OF THE PREFERRED EMBODIMENTS

Figure 1:
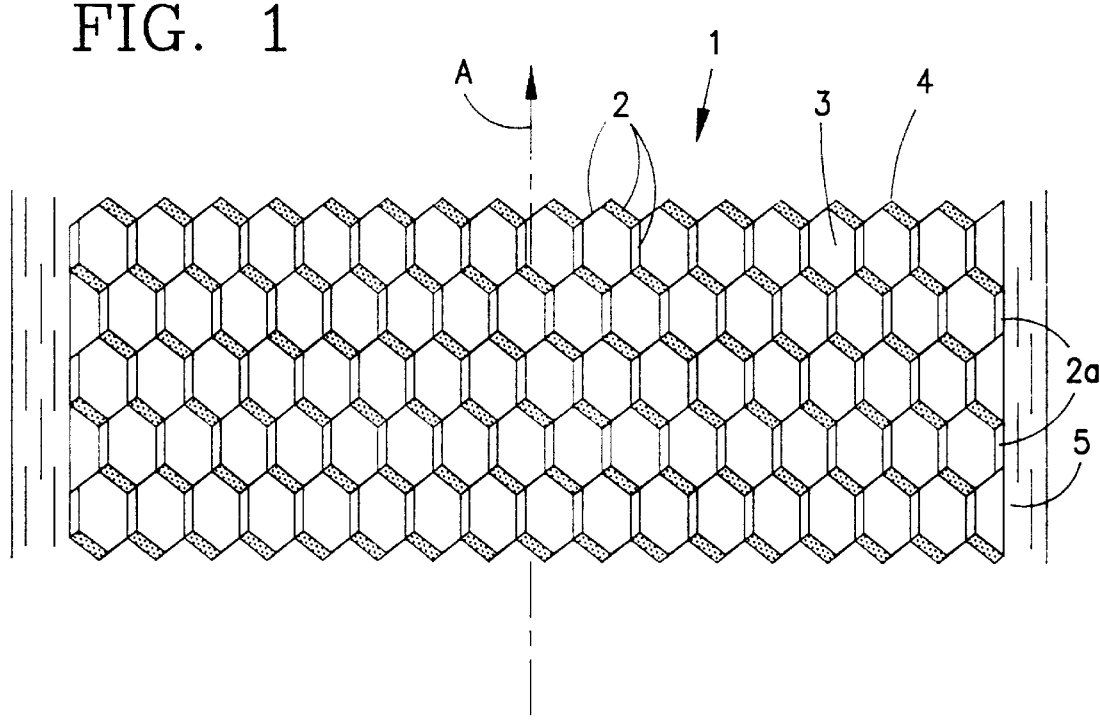
FIG. 1 is a plan view of a single stretched foil strip

FIG. 1 shows, in horizontal projection, a stretched foil strip as a structural part 1 which has been continuously unwound from a roll. At certain distances in the foil conveying direction, A, there are transversely staggered lengthwise cuts formed by cutting wheels in known manner. In this production stage, the foil strip is still a two dimensional plane body. The cuts are then laterally, i.e. transversely to the foil conveying direction, stretched so that hexagonal apertures 3 are formed, which are defined by webs 2 and the foil strip 1 stays intact. The hexagonal apertures 3 are each such that the top 4 points in the foil conveying direction A. The lateral webs 2 twist during the stretching steps so that a three dimensional body with depth is formed. The borders 5 are unstretched and wave formed depending on the use of propulsion, tooth belts or chains. The stretching of the foil laterally provides a length reduction and the borders 5 get the same length reduction by the depth of teeth of the pulling device so as to correspond to the change of length cause by the expansion of the foil strip.

Figure 2:
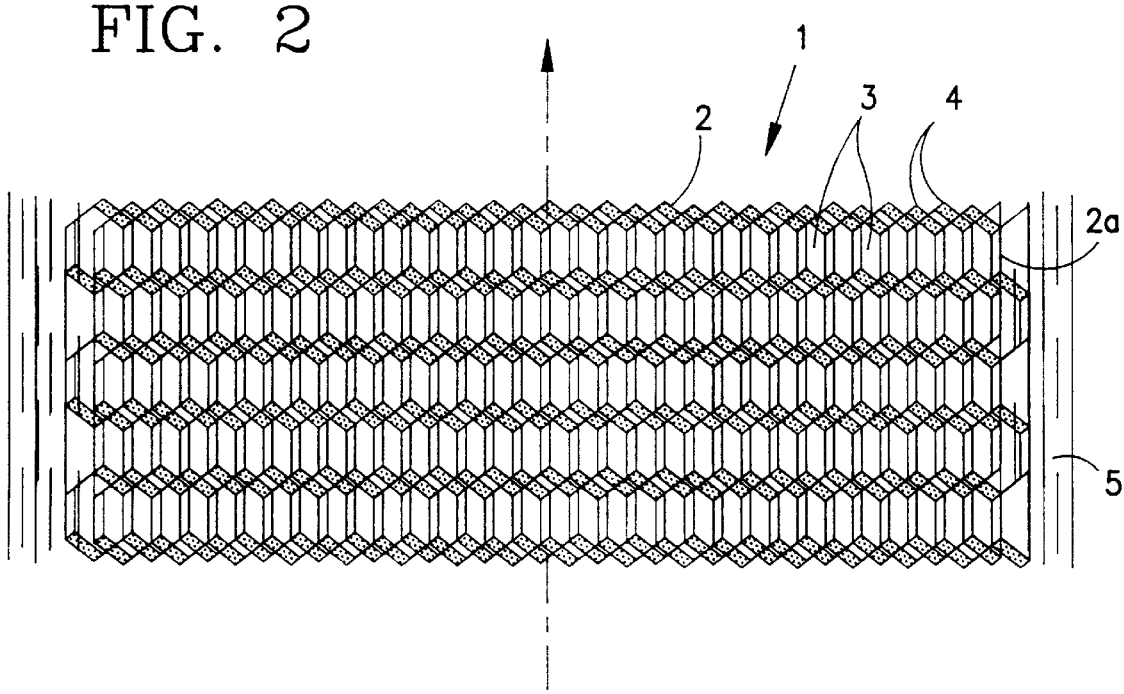
FIG. 2 is a plan view of a multilayered body made of stretched foil strips.

Proceeding from this form body depending on the application, there exists the possibility, to roll the foil strip in the foil conveying direction A, but also transversely thereto. Application fields find themselves also, if, as shown in FIG. 2, the foil strip 1 is multilayered with like strips to form a unit with staggered apertures. It is possible to use the foil strip 1 turned around the longitudinal axis or transverse thereto as an additional layer.

The foil strip 1, can, as mentioned, be multilayered, and sandwiched, twisted in certain distances in the foil conveying direction transversely or at any random angle. The staggered cuts are made by overlapping cutting wheels and are then stretched laterally over a special stretching device without a middle web (honeycomb hexagonal shaped slots are formed) and afterwards cut into lengths. It is also possible to roll up the foil strip 1, if necessary multilayered, to cut it into pieces, to bend it cylindrically, to twist it at the ends and to roll it continuously into cylindrical bodies. For an optimal conservation of stability, the rolling is done under a certain initial tension. It is further possible to form different shapes depending on the application field, e.g. in oviform, spherical, elliptic or other combined shapes.

By a continuous production process, economical manufacturing in large quantities is possible. This is important, as such structural parts are applicable to a multitude of uses and the demand is high.

We claim:

1. A structural element for use as a carrier body for catalytic processes, said structural element comprising:

a sheet of foil material having a length dimension and a width dimension, transverse rows of polygonally shaped apertures in the sheet interconnected by webs of the foil material which are twisted relative to a plane containing the apertures to provide the sheet with a depth dimension, the apertures being staggered row to row and the sheet being formed by providing a roll of foil material, continuously withdrawing the material from the roll, forming transverse rows of staggered lengthwise cuts in the material and stretching the material laterally to transform the cuts into said hexagonal apertures and material between the cuts into said webs, the stretching of the material laterally providing a lengthwise contraction of the materials, the apertures comprise hexagonal apertures having apices oriented in the length direction of the sheet and portions of the webs extending parallel to the length dimension of said sheet of foil material, the sheet of foil material being layered with another same sheet to form a multilayer structure with the apertures in the respective sheets being misaligned, and lengthwise borders absent said apertures of each of said sheets of foil material being bent depthwise of the sheets to provide a same amount of said lengthwise contraction as the material of each of aid sheets having said apertures.

2. A structural element as claimed in claim 1, wherein the sheet is rolled into cylindrical form about one of a lengthwise and a transverse axis.

3. A structural element as claimed in claim 1, contained in edge frame.

\* \* \* \* \*